United States Patent
Bill et al.

[11] Patent Number: 6,142,271
[45] Date of Patent: Nov. 7, 2000

[54] SERVO FRICTION BRAKE

[75] Inventors: Karlheinz Bill, Dreieich; Vladimir Dusil, Griesheim; Matthias Leber, Modautal, all of Germany

[73] Assignee: ITT Manufacturing Enterprises, Inc., Wilmington, Del.

[21] Appl. No.: 09/051,574

[22] PCT Filed: Oct. 18, 1996

[86] PCT No.: PCT/EP96/04540

§ 371 Date: Oct. 9, 1998

§ 102(e) Date: Oct. 9, 1998

[87] PCT Pub. No.: WO97/14594

PCT Pub. Date: Apr. 24, 1997

[30] Foreign Application Priority Data

Oct. 19, 1995 [DE] Germany .......................... 195 39 012

[51] Int. Cl.$^7$ ................................................. F16D 51/00
[52] U.S. Cl. ...................... 188/329; 188/79.56; 188/78; 188/326
[58] Field of Search .................... 188/78, 79.55, 188/156, 162, 325–330, 195, 342, 343

[56] References Cited

U.S. PATENT DOCUMENTS

| | | | |
|---|---|---|---|
| 4,056,175 | 11/1977 | Newstead et al. | 188/196 BA |
| 4,250,981 | 2/1981 | Wilson et al. | 188/327 |
| 4,270,633 | 6/1981 | Coulter et al. | 188/79.56 |
| 4,344,512 | 8/1982 | Woo | 188/79.56 |
| 4,353,437 | 10/1982 | Roberts et al. | 188/79.56 |
| 4,615,419 | 10/1986 | Gaiser | 188/181 T |
| 4,627,519 | 12/1986 | Larsen et al. | 188/1.11 |
| 5,036,960 | 8/1991 | Schenk et al. | 188/346 |
| 5,042,623 | 8/1991 | Yamamoto | 188/79.51 |

FOREIGN PATENT DOCUMENTS

| | | |
|---|---|---|
| 0307208 | 9/1988 | European Pat. Off. . |
| 0195922 | 12/1990 | European Pat. Off. . |
| 900175 | 12/1953 | Germany . |
| 1152320 | 3/1968 | Germany . |
| 1475314 | 5/1969 | Germany . |
| 2030355 | 2/1971 | Germany . |
| 3914051 | 10/1990 | Germany . |
| 4242392 | 6/1994 | Germany . |
| 9408351 | 9/1994 | Germany . |
| 1403742 | 8/1975 | United Kingdom . |

*Primary Examiner*—Michael Mar
*Assistant Examiner*—Mariono Sy
*Attorney, Agent, or Firm*—Rader, Fishman & Grauer PLLC

[57] ABSTRACT

A servo friction brake which includes a carrier, and at least one friction lining which is supported on the carrier and interacts with at least one friction surface, and at least one device for actuating the friction lining. In order to considerably reduce the sensitivity of the friction brake to coefficient of friction and to achieve high servo effect values, especially in the range close to the locking limit, a mechanism which permits varying the servo effect during operation of the brake.

6 Claims, 4 Drawing Sheets

SERVO FRICTION BRAKE

BACKGROUND OF THE INVENTION

The present invention relates to a servo friction brake of the type as disclosed in European patent application No. 0 195 922. The special feature of the prior art friction brake is that a valve for sensing wheel lock is interposed between the two friction linings. As soon as the wheel associated with the respective brake locks, the valve will generate hydraulic pressure which is used to actuate a second valve that permits change-over of effective surfaces provided within the wheel brake cylinder. The result is a reduction of the actuating force applied to the linings so that an anti-lock effect is ensured this way.

It is a shortcoming in the prior art friction brake that hydraulic intervention in the wheel brake cylinder becomes effective only in a case of wheel lock. The intervention includes a simple change-over action so that the brake of the art exhibits a high degree of friction coefficient sensitivity despite the intervention.

Therefore, an object of the present invention is to provide measures permitting a major reduction of the friction coefficient sensitivity. An additional objective is to achieve a great servo effect, especially in the range close to the wheel lock limit.

SUMMARY OF THE INVENTION

According to the present invention, this object is achieved by the provision of means which permit variations in the servo effect during operation of the brake and, preferably, are configured as an adjusting mechanism which permits changes of the angle between the connecting line of the central point of force application between the friction lining and the friction surface with a central force support point of the friction lining, on the one hand, and the direction of the normal force which acts upon the friction lining, on the other hand.

Further, a method of controlling the servo effect of a servo friction brake is disclosed in the present invention, wherein the components of the actuating force, which act vertically on the friction lining, and the boosting force which is due to the servo effect are added to the normal force, and the friction force acting between the friction lining and the friction surface is generated by the effect of the normal force. According to the present invention, a signal representative of the friction force is produced and sent, along with a signal representative of the desired servo effect and a signal representative of the actuating force, as input quantities to a controller. The output quantity of the controller serves to actuate an actor with a view to influencing the boosting force.

Further details, features and advantages of the present invention can be taken from the following description of an embodiment making reference to the accompanying drawings wherein corresponding individual parts have been assigned like reference numerals.

DETAILED DESCRIPTION OF THE DRAWINGS

Figure 1:
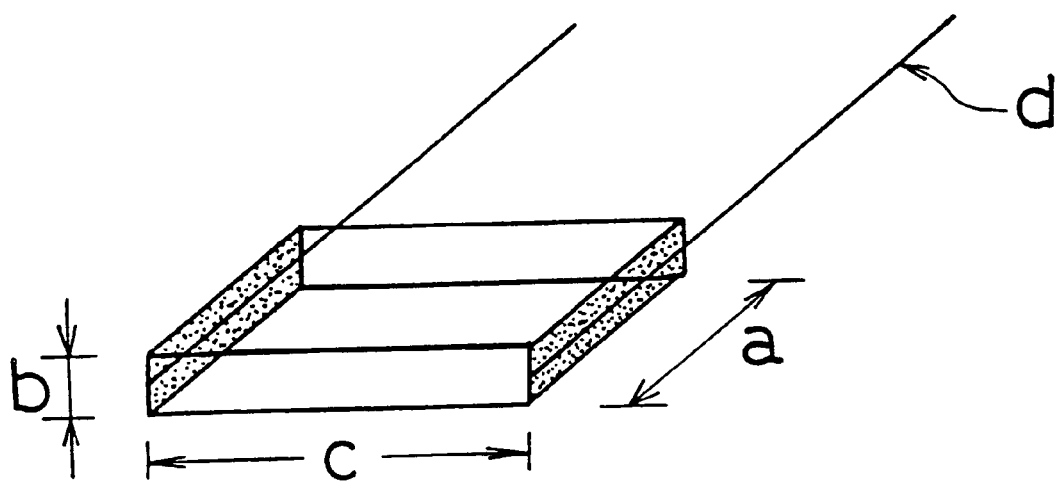
FIG. 1 is a friction or duplex brake according to the present invention.

The drum or duplex brake shown in the FIG. 1 embodiment includes a brake carrier 1 on which two brake shoes 2, 3 equipped with brake linings are radially opposed. Brake shoes 2, 3 are operable by way of pivoted clamping cams 4, 5 by an actuating device 6, i.e., are movable into engagement with a brake drum (not shown). The clamping cams 4, 5 act on an end of the brake shoe 2, 3 by way of each one force-transmitting element 7, 8 screwed to the brake shoe 2, 3. The other end of brake shoe 2, 3 is supported on the brake carrier 1 by way of a central force support point A (see FIG. 3). The force-transmitting element 7, 8 is preferably provided with force-measuring elements, for example, wire strain gages, which are schematically shown on the force-transmitting element 8 and are assigned reference numerals 23, 24. The force support point A in the embodiment shown is provided on a preferably radially adjustable sliding carriage 9 of an adjusting mechanism which bears reference numeral 10. The sliding carriage 9 is driven by an electric stepping motor 11 preferably by the intermediary of a ball-and-thread drive assembly 21 (shown only schematically). In the direction of its vertical axis, carriage 9 includes two rotatable supporting rollers 12, 13 which are arranged one below the other and interact with two mating running surfaces 14, 15 on the brake shoe 2. On its side remote from the brake shoe 2, 3, the sliding carriage 9 includes pairs of rollers 16, 17 or 18 arranged one below the other in the direction of its vertical axis. The pairs of rollers interact with a guideway 19 which preferably has a prismatic design and is rigidly screwed to the brake carrier 1. A sensor device 20 is supported on the guideway 19 and permits determining the friction force $F_R$ (FIG. 3) which acts between the friction lining 2 and the brake drum (not shown).

Figure 2:
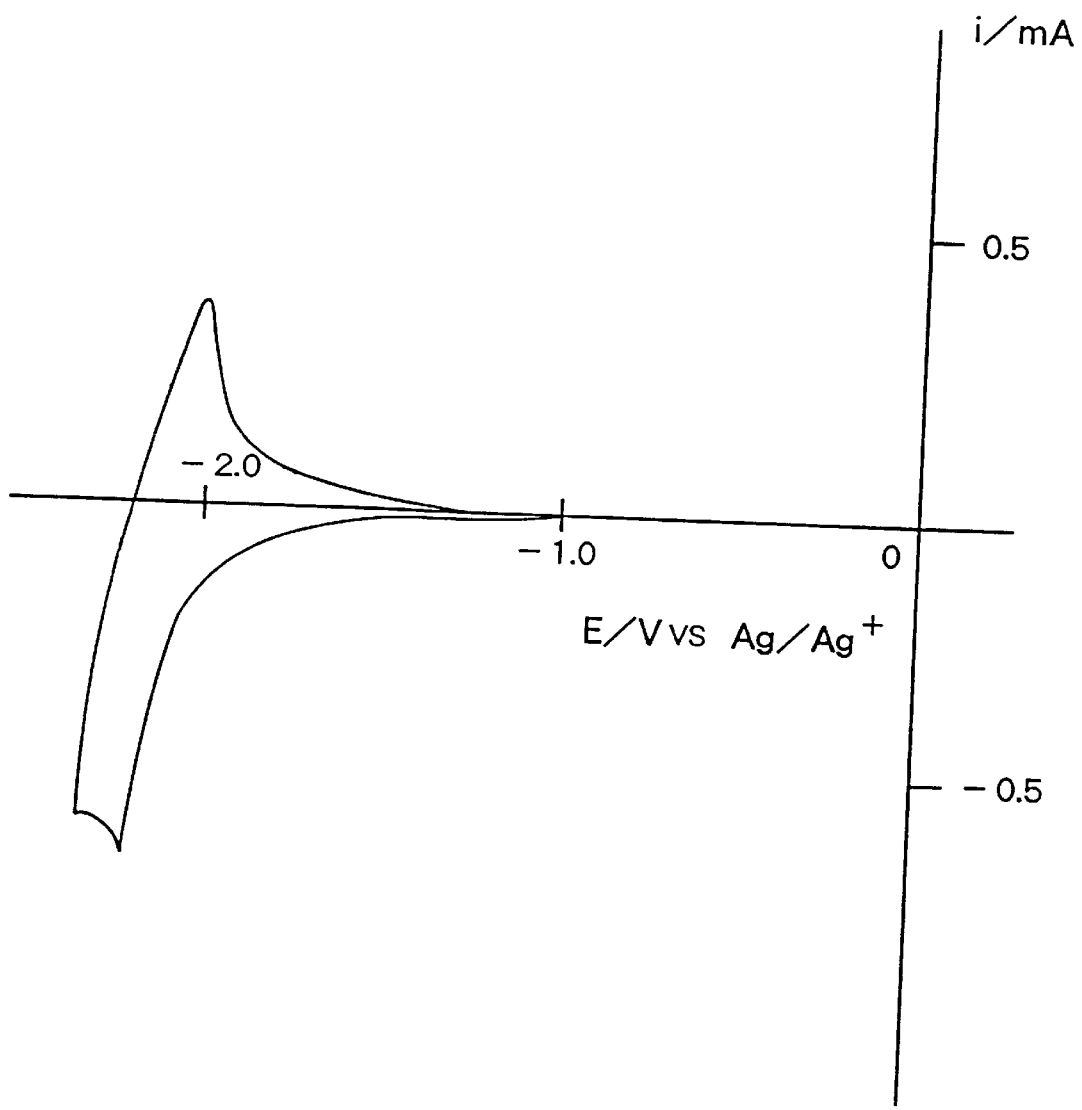
FIG. 2 is an enlarged view of a cross-section taken along line 'C—C' of FIG. 1.
Figure 3:
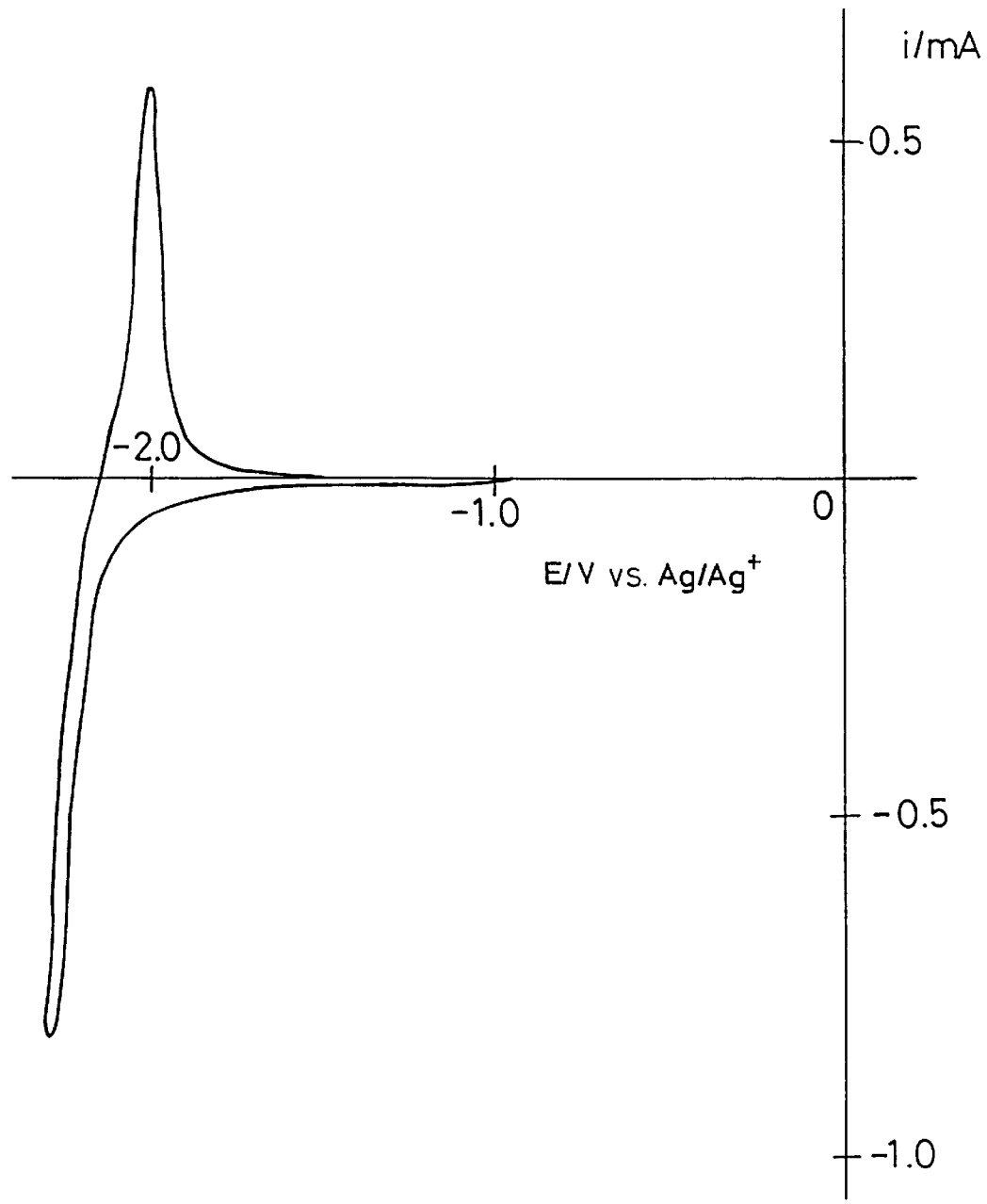
FIG. 3 is a schematic view of the function principle of the duplex brake shown in FIGS. 1 and 2.

As can be seen in FIG. 3, the force support point A produced by the supporting rollers 12, 13 (FIGS. 1, 2) can be adjusted upon actuation of the stepped motor 11 with the supporting force $F_{st}$ in the drawing from $a_{max}$ to $a_{min}$ so that the angle β is changed between the connecting line AB of the central point of force application B between the friction lining 2 and the brake drum 22 (shown only schematically) with the central force support point A of the brake shoe 2 produced by the supporting rollers 12, 13, on the one hand, and the direction of the normal force $F_N$ acting on the brake shoe 2, on the other hand. The normal force $F_N$ is composed of an actuating force component $F_{Bet}$ which acts in the point of force application B and a boosting force $F_{ver}$ which results from the servo effect.

Figure 4:
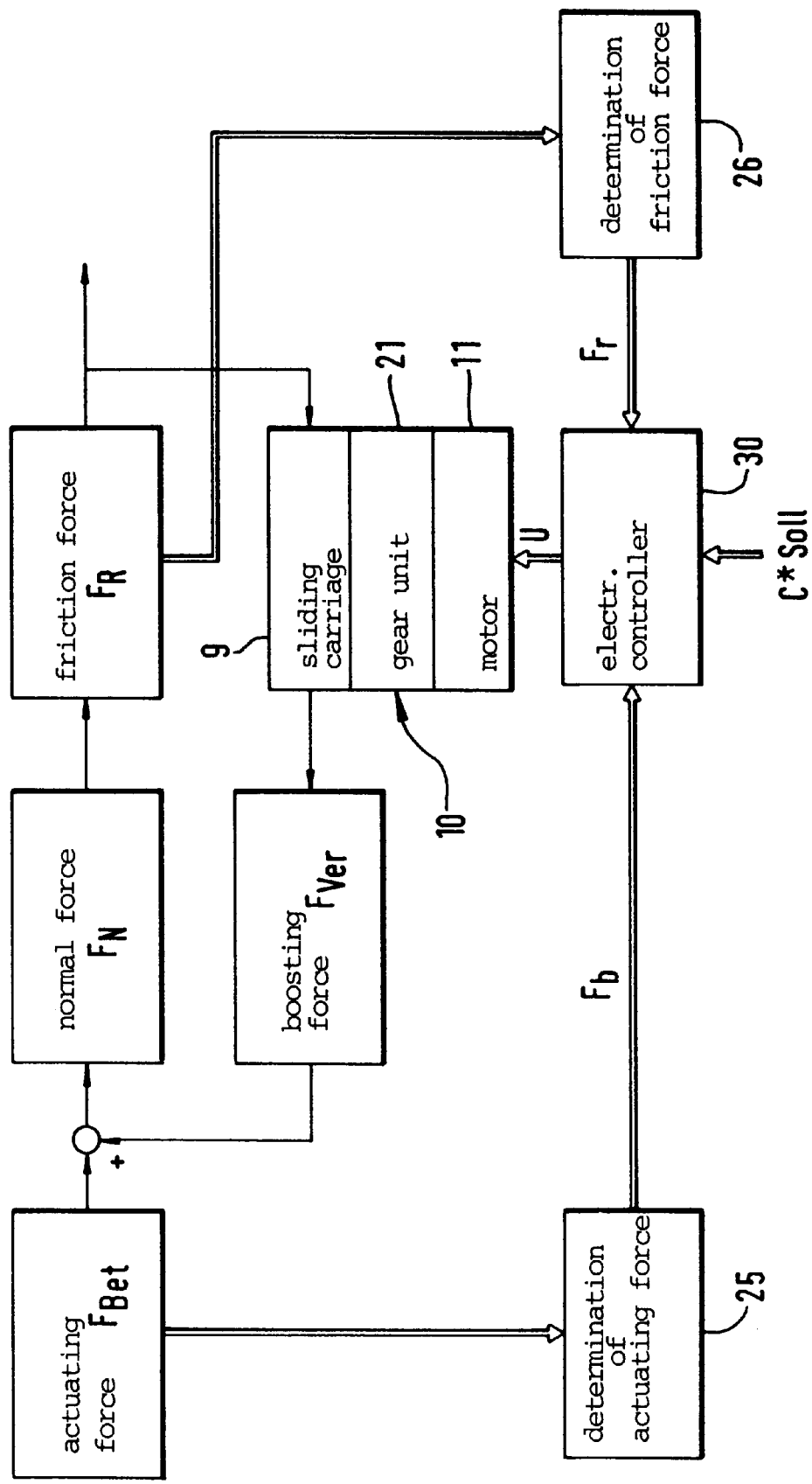
FIG. 4 is a view of a simplified control circuit for implementing the method of controlling the servo effect of the duplex brake shown in FIGS. 1 to 3 according to the present invention.
Figure 1:
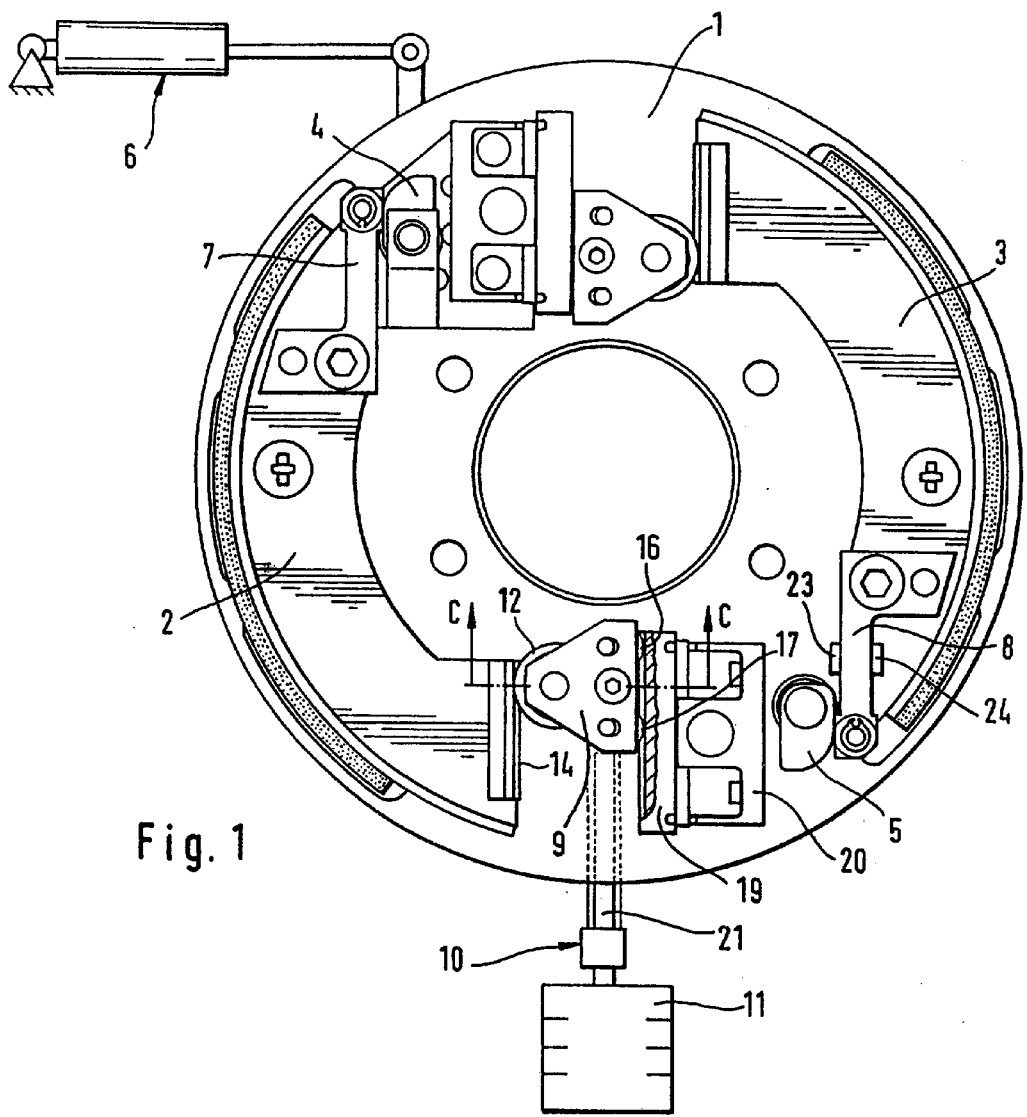
Figure 2:
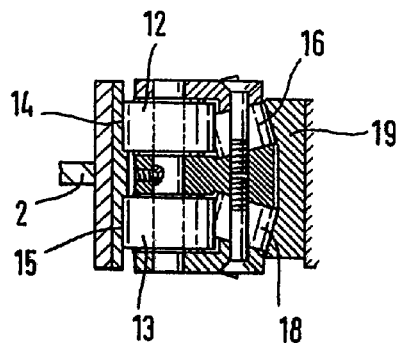
Figure 3:
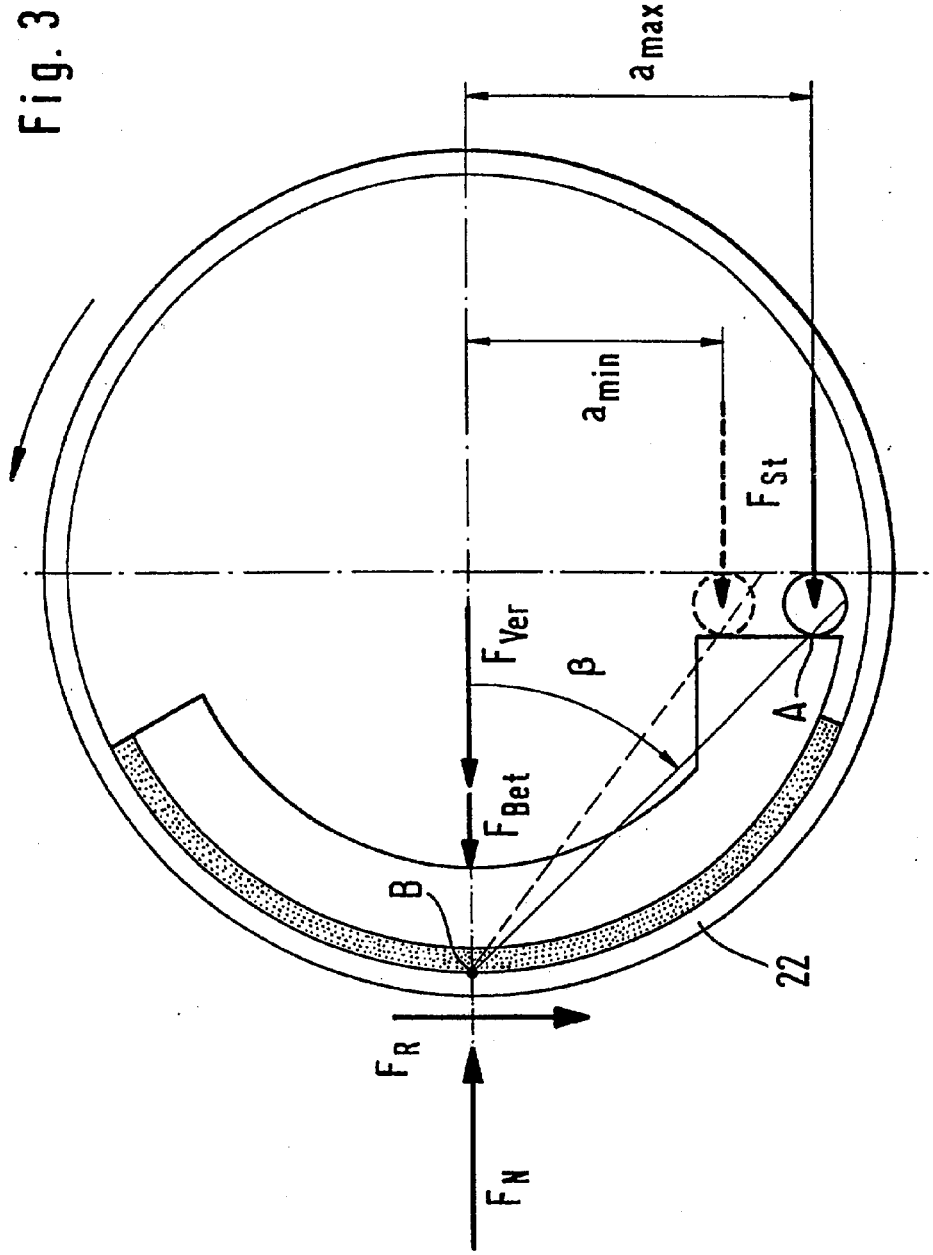
Figure 4:
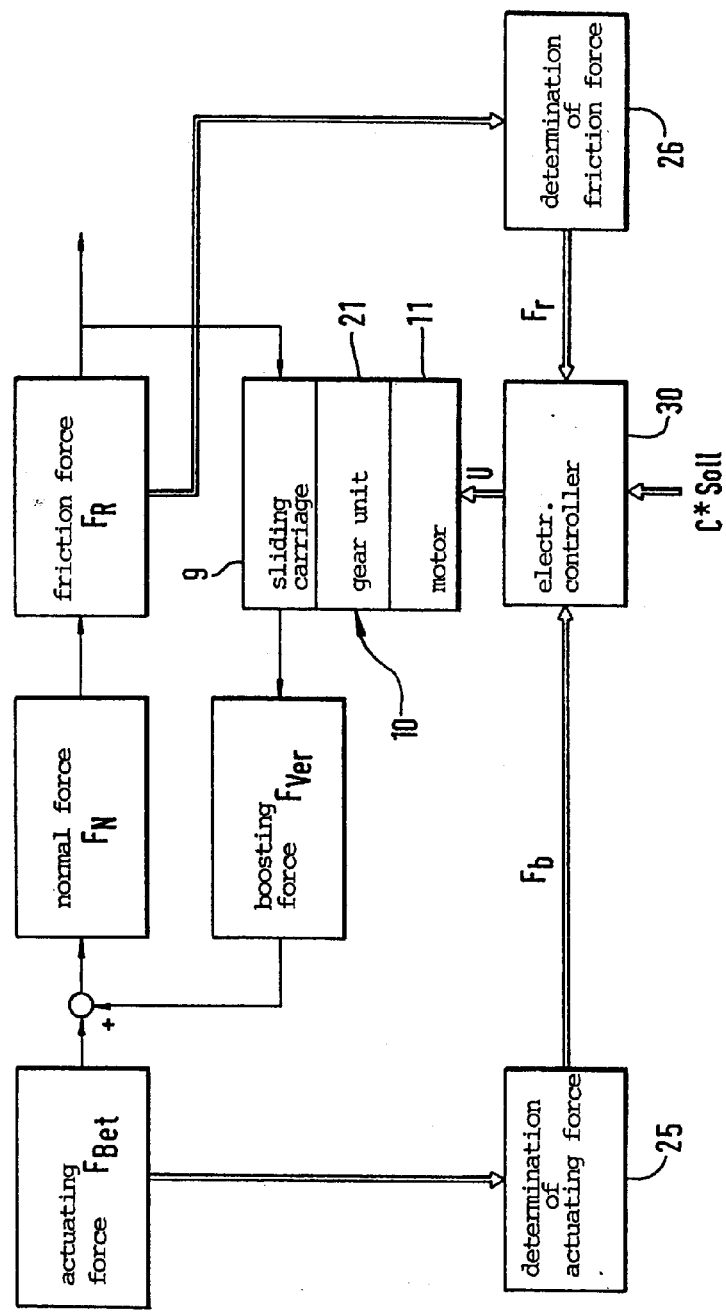

The implementation of the above-mentioned method of controlling the servo effect of a servo friction brake is explained with respect to the control circuit shown in FIG. 4. Thus, it can be seen in FIG. 4 that, on the friction lining 2, the actuating force component $F_{Bet}$ acting on the friction lining and the boosting force $F_{ver}$ resulting from the servo effect are added, and the sum of the two forces represents the normal force $F_N$ mentioned in the above text. The effect of the normal force $F_N$ causes generation of the friction force $F_R$ which acts between the friction lining 2 and the brake drum 22 (FIG. 3) and is converted into a brake force acting on the vehicle wheel. The blocks assigned reference numerals 25 and 26 in FIG. 4 represent the operation of the force measuring device 7, 8 or 23, 24, respectively (mentioned with respect to FIG. 1) and the sensor device 20 which are used to determine the actuating force which acts on the friction lining 2 and the friction force which acts between the friction lining 2 and the brake drum 22. The signals $F_b$ and $F_r$ corresponding to the above mentioned quantities are sent to an electronic controller 30 along with a set value signal $C^*_{soll}$ representative of the desired servo effect. In controller 30, the instantaneously acting servo effect $C^*_{ist}$ is calculated from the input signals $F_b$ and $F_r$ and the distance a (see FIG. 3) and a control difference $\Delta C^*$ is produced. The controller calculates for the actual value $C^*_{is}$, a new distance a and compares it with the value a calculated in the previous control step. The new position for a is calculated from the result of this comparison. Subsequently, the control cycle restarts. The output signal U of the controller 30 is used to actuate the stepped motor 11 to the end of varying the angle β explained with respect to FIG. 3 for the purpose of adjusting the desired servo effect $C^*_{soll}$ or influencing the boosting force $F_{ver}$.

The present invention relates to a servo friction brake according to the preamble of patent claim 1.

A friction brake of this type is disclosed in European patent application No. 0 195 922. The special feature of the prior art friction brake is that a valve for sensing wheel lock is interposed between the two friction linings. As soon as the wheel associated with the respective brake locks, the valve will generate hydraulic pressure which is used to actuate a second valve that permits change-over of effective surfaces provided within the wheel brake cylinder. The result is a reduction of the actuating force applied to the linings so that an anti-lock effect is ensured this way.

It is a shortcoming in the prior art friction brake that hydraulic intervention in the wheel brake cylinder becomes effective only in a case of wheel lock. The intervention includes a simple change-over action so that the brake of the art exhibits a high degree of friction coefficient sensitivity despite the intervention.

Therefore, an object of the present invention is to provide measures permitting a major reduction of the friction coefficient sensitivity. An additional objective is to achieve a great servo effect, especially in the range close to the wheel lock limit.

According to the present invention, this object is achieved by the provision of means which permit variations in the servo effect during operation of the brake and, preferably, are configured as an adjusting mechanism which permits changes of the angle between the connecting line of the central point of force application between the friction lining and the friction surface with a central force support point of the friction lining, on the one hand, and the direction of the normal force which acts upon the friction lining, on the other hand.

Favorable aspects of the subject matter of the present invention can be taken from subclaims 3 to 24.

Further, a method of controlling the servo effect of a servo friction brake is disclosed in the present invention, wherein the components of the actuating force, which act vertically on the friction lining, and the boosting force which is due to the servo effect are added to the normal force, and the friction force acting between the friction lining and the friction surface is generated by the effect of the normal force. According to the present invention, a signal representative of the friction force is produced and sent, along with a signal representative of the desired servo effect and a signal representative of the actuating force, as input quantities to a controller. The output quantity of the controller serves to actuate an actor with a view to influencing the boosting force.

Further details, features and advantages of the present invention can be taken from the following description of an embodiment making reference to the accompanying drawings wherein corresponding individual parts have been assigned like reference numerals. In the drawings, FIG. 1 is a friction or duplex brake according to the present invention.

FIG. 2 is an enlarged view of a cross-section taken along line 'C—C' of FIG. 1.

FIG. 3 is a schematic view of the function principle of the duplex brake shown in FIGS. 1 and 2.

FIG. 4 is a view of a simplified control circuit for implementing the method of controlling the servo effect of the duplex brake shown in FIGS. 1 to 3 according to the present invention.

The drum or duplex brake shown in the FIG. 1 embodiment includes a brake carrier 1 on which two brake shoes 2, 3 equipped with brake linings are radially opposed. Brake shoes 2, 3 are operable by way of pivoted clamping cams 4, 5 by an actuating device 6, i.e., are movable into engagement with a brake drum (not shown) . The clamping cams 4, 5 act on an end of the brake shoe 2, 3 by way of each one force-transmitting element 7, 8 screwed to the brake shoe 2, 3. The other end of brake shoe 2, 3 is supported on the brake carrier 1 by way of a central force support point A (see FIG. 3). The force-transmitting element 7, 8 is preferably provided with force-measuring elements, for example, wire strain gages, which are schematically shown on the force-transmitting element 8 and are assigned reference numerals 23, 24. The force support point A in the embodiment shown is provided on a preferably radially adjustable sliding carriage 9 of an adjusting mechanism which bears reference numeral 10. The sliding carriage 9 is driven by an electric stepping motor 11 preferably by the intermediary of a ball-and-thread drive assembly 21 (shown only schematically) . In the direction of its vertical axis, carriage 9 includes two rotatable supporting rollers 12, 13 which are arranged one below the other and interact with two mating running surfaces 14, 15 on the brake shoe 2. On its side remote from the brake shoe 2, 3, the sliding carriage 9 includes pairs of rollers 16, 17 or 18 arranged one below the other in the direction of its vertical axis. The pairs of rollers interact with a guideway 19 which preferably has a prismatic design and is rigidly screwed to the brake carrier 1. A sensor device 20 is supported on the guideway 19 and permits determining the friction force $F_R$ (FIG. 3) which acts between the friction lining 2 and the brake drum (not shown).

As can be seen in FIG. 3, the force support point A produced by the supporting rollers 12, 13 (FIGS. 1, 2) can be adjusted upon actuation of the stepped motor 11 with the supporting force $F_{st}$ in the drawing from $a_{max}$ to $a_{min}$ so that the angle β is changed between the connecting line AB of the central point of force application B between the friction lining 2 and the brake drum 22 (shown only schematically) with the central force support point A of the brake shoe 2 produced by the supporting rollers 12, 13, on the one hand, and the direction of the normal force $F_N$ acting on the brake shoe 2, on the other hand. The normal force $F_N$ is composed of an actuating force component $F_{Bet}$ which acts in the point of force application B and a boosting force $F_{ver}$ which results from the servo effect.

The implementation of the above-mentioned method of controlling the servo effect of a servo friction brake is explained with respect to the control circuit shown in FIG. 4. Thus, it can be seen in FIG. 4 that, on the friction lining 2, the actuating force component $F_{Bet}$ acting on the friction lining and the boosting force $F_{ver}$ resulting from the servo effect are added, and the sum of the two forces represents the normal force $F_N$ mentioned in the above text. The effect of the normal force $F_N$ causes generation of the friction force $F_R$ which acts between the friction lining 2 and the brake drum 22 (FIG. 3) and is converted into a brake force acting on the vehicle wheel. The blocks assigned reference numerals 25 and 26 in FIG. 4 represent the operation of the force measuring device 7, 8 or 23, 24, respectively (mentioned with respect to FIG. 1) and the sensor device 20 which are used to determine the actuating force which acts on the friction lining 2 and the friction force which acts between the friction lining 2 and the brake drum 22. The signals $F_b$ and $F_r$ corresponding to the above mentioned quantities are sent to an electronic controller 30 along with a set value signal $C^*_{soll}$ representative of the desired servo effect. In controller 30, the instantaneously acting servo effect $C^*_{ist}$ is calculated from the input signals $F_b$ and $F_r$ and the distance a (see FIG. 3) and a control difference $\Delta C^*$ is produced. The controller calculates for the actual value $C^*_{ist}$ a new distance a and compares it with the value a calculated in the previous control step. The new position for a is calculated from the result of this comparison. Subsequently, the control cycle restarts. The output signal U of the controller 30 is used to actuate the stepped motor 11 to the end of varying the angle β explained with respect to FIG. 3 for the purpose of adjusting the desired servo effect $C^*_{soll}$ or influencing the boosting force $F_{ver}$.

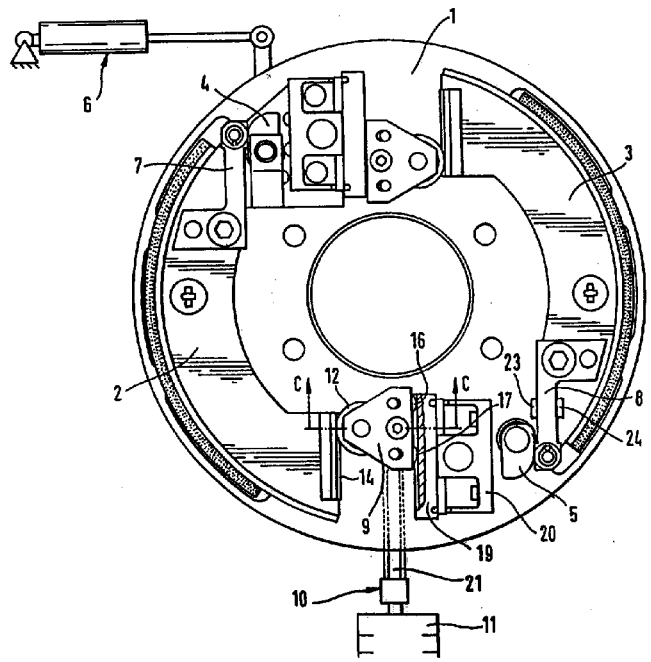

What is claimed is:

1. A friction brake, comprising a carrier, at least one friction lining supported on the carrier and interacting with at least one friction surface, and at least one device for actuating the friction lining against the friction surface causing a servo effect, wherein means are provided which permit varying the servo effect during operation of the brake, wherein a central force action point between the friction lining and the friction surface and a central force support point of the friction lining, with a virtual connecting line between the two points, and with a normal force acting on the friction lining, wherein means to vary the servo effect are configured as an adjusting mechanism which permits variations of the angle between the connecting line and the direction of the normal force acting on the friction lining, wherein the friction brake is configured as a duplex brake, wherein the variations of the angle arc made by adjusting the central force support point of the friction lining, wherein the adjusting mechanism is provided by a sliding carriage which is adjustable by a drive and represents the central force support point, wherein the drive is an electric actor.

2. A friction brake as claimed in claim 1, wherein the actor is a motor with a subsequent gear unit.

3. A friction brake as claimed in claim 2, wherein the gear unit is a thread drive assembly.

4. A friction brake as claimed in claim 1, wherein the actor is a linear motor.

5. A friction brake as claimed in claim 1, wherein the central force support point is provided by at least one supporting roller pivoted in the sliding carriage and interacting with a running surface on the friction lining.

6. A friction brake as claimed in claim 1, wherein the sliding carriage includes at least two supporting rollers remote from the friction lining which interact with a guideway rigidly arranged on the carriage.

* * * * *

UNITED STATES PATENT AND TRADEMARK OFFICE
CERTIFICATE OF CORRECTION

| | | |
|---|---|---|
| PATENT NO. | : 6,142,271 | |
| DATED | : November 7, 2000 | |
| INVENTOR(S) | : Karlheinz Bill, Vladimir Dusil and Matthias Leber | |

It is certified that error appears in the above-identified patent and that said Letters Patent is hereby corrected as shown below:

Drawings,
Please replace all of the drawings in the patent (Figs. 1-4) with the attached drawings (Figs. 1-4). The drawings printed on the patent are not the drawings which were filed with this application, and do not belong to this patent.

Signed and Sealed this

Twenty-fourth Day of June, 2003

JAMES E. ROGAN
*Director of the United States Patent and Trademark Office*

United States Patent [19]
Bill et al.

[11] Patent Number: 6,142,271
[45] Date of Patent: Nov. 7, 2000

[54] SERVO FRICTION BRAKE

[75] Inventors: Karlheinz Bill, Dreieich; Vladimir Dusil, Griesheim; Matthias Leber, Modautal, all of Germany

[73] Assignee: ITT Manufacturing Enterprises, Inc., Wilmington, Del.

[21] Appl. No.: 09/051,574

[22] PCT Filed: Oct. 18, 1996

[86] PCT No.: PCT/EP96/04540

§ 371 Date: Oct. 9, 1998

§ 102(e) Date: Oct. 9, 1998

[87] PCT Pub. No.: WO97/14594

PCT Pub. Date: Apr. 24, 1997

[30] Foreign Application Priority Data

Oct. 19, 1995 [DE] Germany ............... 195 39 012

[51] Int. Cl.$^7$ .................................................. F16D 51/00
[52] U.S. Cl. ................ 188/329; 188/79.56; 188/78; 188/326
[58] Field of Search ................... 188/78, 79.55, 188/156, 162, 325–330, 195, 342, 343

[56] References Cited

U.S. PATENT DOCUMENTS

| | | | |
|---|---|---|---|
| 4,056,175 | 11/1977 | Newstead et al. | 188/196 BA |
| 4,250,981 | 2/1981 | Wilson et al. | 188/327 |
| 4,270,633 | 6/1981 | Coulter et al. | 188/79.56 |
| 4,344,512 | 8/1982 | Woo | 188/79.56 |
| 4,353,437 | 10/1982 | Roberts et al. | 188/79.56 |
| 4,615,419 | 10/1986 | Gaiser | 188/181 T |
| 4,627,519 | 12/1986 | Larsen et al. | 188/1.11 |
| 5,036,960 | 8/1991 | Schenk et al. | 188/346 |
| 5,042,623 | 8/1991 | Yamamoto | 188/79.51 |

FOREIGN PATENT DOCUMENTS

| | | |
|---|---|---|
| 0307208 | 9/1988 | European Pat. Off. . |
| 0195922 | 12/1990 | European Pat. Off. . |
| 900175 | 12/1953 | Germany . |
| 1152320 | 3/1968 | Germany . |
| 1475314 | 5/1969 | Germany . |
| 2030355 | 2/1971 | Germany . |
| 3914051 | 10/1990 | Germany . |
| 4242392 | 6/1994 | Germany . |
| 9408351 | 9/1994 | Germany . |
| 1403742 | 8/1975 | United Kingdom . |

*Primary Examiner*—Michael Mar
*Assistant Examiner*—Mariono Sy
*Attorney, Agent, or Firm*—Rader, Fishman & Grauer PLLC

[57] ABSTRACT

A servo friction brake which includes a carrier, and at least one friction lining which is supported on the carrier and interacts with at least one friction surface, and at least one device for actuating the friction lining. In order to considerably reduce the sensitivity of the friction brake to coefficient of friction and to achieve high servo effect values, especially in the range close to the locking limit, a mechanism which permits varying the servo effect during operation of the brake.

6 Claims, 4 Drawing Sheets